United States Patent [19]

Gerresheim

[11] 3,867,838

[45] Feb. 25, 1975

[54] INSTRUMENT HUB FOR THE MEASUREMENT OF FORCES AND/OR MOMENTS

[75] Inventor: Manfred Gerresheim, Munich, Germany

[73] Assignee: Gebr. Hofmann KG, Darmstadt, Germany

[22] Filed: Dec. 26, 1973

[21] Appl. No.: 428,303

Related U.S. Application Data

[63] Continuation of Ser. No. 221,592, Jan. 28, 1972, abandoned.

[30] Foreign Application Priority Data

Jan. 28, 1971 Germany............................ 2104003

[52] U.S. Cl................................. 73/133 R, 73/146
[51] Int. Cl............................ G01l 5/16, G01l 5/20
[58] Field of Search.......... 73/133 R, 141 A, 136 C, 73/146, 147

[56] References Cited
UNITED STATES PATENTS

| | | |
|---|---|---|
| 2,403,952 | 7/1946 | Ruge.................................. 73/136 C |
| 3,100,990 | 8/1963 | Dimeff................................... 73/147 |
| 3,132,519 | 5/1964 | Federn.................................. 73/471 |
| 3,492,864 | 2/1970 | Kraeling et al. ............... 73/141 A X |
| 3,561,263 | 2/1971 | Ward et al. ......................... 73/133 R |
| 3,590,633 | 7/1971 | Fuhrmann............................. 73/146 |
| 3,600,942 | 8/1971 | Brendel............................. 73/141 A |
| 3,693,425 | 9/1972 | Starita et al. ..................... 73/517 X |

Primary Examiner—Charles A. Ruehl
Attorney, Agent, or Firm—Cushman, Darby and Cushman

[57] ABSTRACT

An apparatus and method for measuring forces and/or moments acting on a rotor whereby a hub having a plurality of beams forming right angles with each other and resiliently deformable is attached to a rotor. A strain gauge is preferably attached to each beam and the strain gauges in turn connected in a Wheatstone bridge circuit. The beams preferably connect inner and outer cylindrical members and form a cross, rectangle or square.

17 Claims, 10 Drawing Figures

INSTRUMENT HUB FOR THE MEASUREMENT OF FORCES AND/OR MOMENTS

This is a continuation of application Ser. No. 221,592, filed Jan. 28, 1972, now abandoned.

The invention relates to a method for the measurement of forces and/or moments acting on rotors in motion and more particularly on motor vehicle wheels, wherein for the measurement strain gauges are used which are attached to a number of beams forming a right angle with each other and being resiliently deformable under the action of forces and/or moments, the beams being part of an instrumented hub which is connected to a rotor and more particularly to a motor vehicle wheel, and wherein the strain guages of various beams are connected in form of a Wheatstone bridge circuit and the individual forces and/or moments of the change in voltage of the Wheatstone bridge circuit are detected. The invention further pertains to an instrumented hub for the execution of this method.

Two types of measuring devices are now used for measuring forces and moments acting on rotating vehicle wheels. These are the so-called measuring shaft developed by the Technological University of Delft and the beam hub of General Motors. Both devices are based on the principle of converting deformations on strain gauges into electrical voltage changes.

In the measuring shaft device, the forces of the tire during rotation (load under wheel and/or tire-road contact pressure and tangential force) are transmitted via beams to diaphragms or leaf springs to which strain gauges are attached so that, not beam deformations, but rather the deformations of the leaf springs indicate the forces and moments on the wheels. The axial force acts on two members which are arranged parallel to the rotational axis of the wheel and which have strain gauges pasted thereon. The whole assembly permits the direct detection of forces and moments. In addition, driven or braked wheels can be examined.

One disadvantage, however, of this type of device is that the construction requires too much space and, therefore, cannot be conveniently installed in motor vehicles. For this reason, the forces and moments which occur under actual operating conditions and which are frequently of primary interest cannot be monitored. A further disadvantage is presented by the complexity of construction.

General Motors' beam hub is similar but can be mounted on motor vehicles so that measurement is not restrained to the use of test stands. However, measurement is possible only on non-driven wheels. Further, the strain guages are attached to the beams in the areas of greatest flexural moments. Therefore, direct detection of the camber and slip moments is not possible, since the moments are only measured in connection with forces, i.e., the deformations converted into electrical changes in voltage result from a superposition of moments and forces. Detection of moments still requires additional differentiation which, however, impairs the accuracy of measuring. Furthermore, the electrical measuring equipment to produce this differentiation makes the structure prohibitively expensive.

Based on the aforementioned state of the art, an object of this invention is an improved method and instrumented hub particularly with a high proper frequency for the purpose of detecting forces or moments acting on rotors in motion and more particularly on motor vehicle wheels. This invention improves the accuracy of measurement while, however, preserving simplicity. Further, it is an object to measure, not only on test stands, but on the device installed, i.e., to measure the stresses occurring during rotation. Last but not least, it is an object to measure on driven and/or braked wheels.

These objects are carried out according to the invention of this application by sensing the individual forces and/or moments by beams and/or strain gauges attached to them, which are parallel to the direction of the individual forces and/or parallel to a plane perpendicular to the respective vector of moments or which are in direction of the individual forces and/or in a plane perpendicular to the respective vector of moments. For this purpose, it may be sufficient if only one beam is provided for each force and/or component while for each moment in two planes at least one beam should be provided.

Since, according to the invention, the individual forces and/or moments are sensed by means of elastic deformation of beams which are parallel to the direction of forces and/or parallel to a plane perpendicular to the respective vector of moments, only pure extensions and compressions will show in the beams with no flexural properties. Thus, forces and/or moments can be determined most accurately and simply. Further, not only forces but also moments can be sensed directly. The instrumented hub is so simple and can be made of such restricted dimensions that it can be installed in motor vehicles without difficulty. In addition driven or braked wheels can be sensed.

Strictly speaking, when greater moments occur in the beams, this will not only cause extensions and/or compressions but also flexures to a certain extent. However, this flexure can be disregarded when the strain gauges are attached in the center of the beams, i.e., in the area where the least flexural moments occur so that the strain gauges only respond substantially to tractive or pressure loads. The aforementioned beam crosses may also be arranged on one side of the wheel center plane at a different distance therefrom.

In preferred embodiment of the hub for carrying out the method according to the invention the four beams are mounted at right angles to each other and alternating in perpendicular and horizontal positions in the center plane of the rotor and/or wheel. In this embodiment, however, only forces not moments can be measured.

According to a further preferred embodiment, four beams at right angles and alternating in perpendicular and horizontal positions are arranged symmetrically on both sides of the center plane of the rotor and/or wheel. The four beams in this configuration may form a cross, a square, or a rectangle. For measuring a lateral force S, two and more, particularly four, beams may in addition to the above-mentioned ones be arranged parallel to each other and to the rotational axis of the rotor and/or the wheel. The angular distance of two adjacent beams is always 90°.

According to another preferred embodiment, the beams interconnect a hollow inner body (and more particularly a hollow internal cylinder) and a hollow outer body (and more particularly a hollow external cylinder); the two bodies and/or cylinders are rigid in comparison to the beams, so that, due to the forces and/or moments, only the beams are resiliently deformable. For this purpose, it is important that the internal and external cylinders be concentric. It is advantageous to fasten the strain gauges lengthwise in the center of the beams in order to avoid slight slips in the measuring results caused by flexural tensions. One or several strain gauges may be placed on each side of a beam so that, by increasing the input voltage of a conventional Wheatstone bridge circuit, a higher sensitivity is obtained. It is desirable that bearings for the internal cylinder be provided for accommodating a shaft driving the wheel in order that driven wheels in rotation can be scanned.

If the beams are not arranged in form of a cross and, therefore, do not represent a so-called beam cross but are shaped like a square, the beams can be increased in length in order to permit the application of a larger number of strain gauges. The strain gauges fixed on the individual beams may be connected in form of either a whole or a half Wheatstone bridge. However, due to its widely known advantages, preference is given to a whole bridge.

According to a particularly advantageous embodiment of the invention, the strain gauges in the Wheatstone bridges are connected so that the changes in voltage measured through the intermediary of the Wheatstone bridge are linearly dependent on the forces and moments to be measured, permitting greater accuracy to be obtained than otherwise possible. There is a further advantage in that only two points are necessary to plot the calibration curves since these are straight lines. Based on the aforementioned linearity, there are a number of Wheatstone bridges and circuits of the individual strain gauges which can be used for determining the individual forces and moments.

One Wheatstone bridge for measuring a tire patch force P of the wheel is characterized in that the strain gauges of the four beams mounted parallel to the direction of the tire patch force P are arranged opposite to the strain gauges of the beams on the same side of the axis of rotation and in that the input voltage is applied to two points each connecting the strain gauges of the two beams which are on opposite sides of the axis of rotation and more particularly are not in alignment with each other.

A Wheatstone bridge for measuring a tangential force U is characterized in that the strain gauges of the four beams parallel to the direction of the tangential force U are arranged opposite to the strain gauges of the beams on the same side of the rotational axis of the wheel and in that the input voltage is applied to two points each connecting the strain gauges of the two beams which are on opposite sides of the rotational axis of the wheel and more particularly are not in alignment with each other.

A Wheatstone bridge circuit for measuring a camber moment $M_s$ is characterized in that the strain gauges of the four beams parallel to a plane perpendicular to the vector of the camber moment $M_s$ are arranged opposite to the strain gauges of the two beams located in spaced relation in direction of the rotational axis of the wheel and on opposite sides of it, and in that the input voltage is applied to two points each connecting the strain gauges fixed to beams which are on opposite sides of the rotational axis of the wheel and more particularly are not in alignment with each other.

Reference is now made to the drawing in which.

Figure 1:
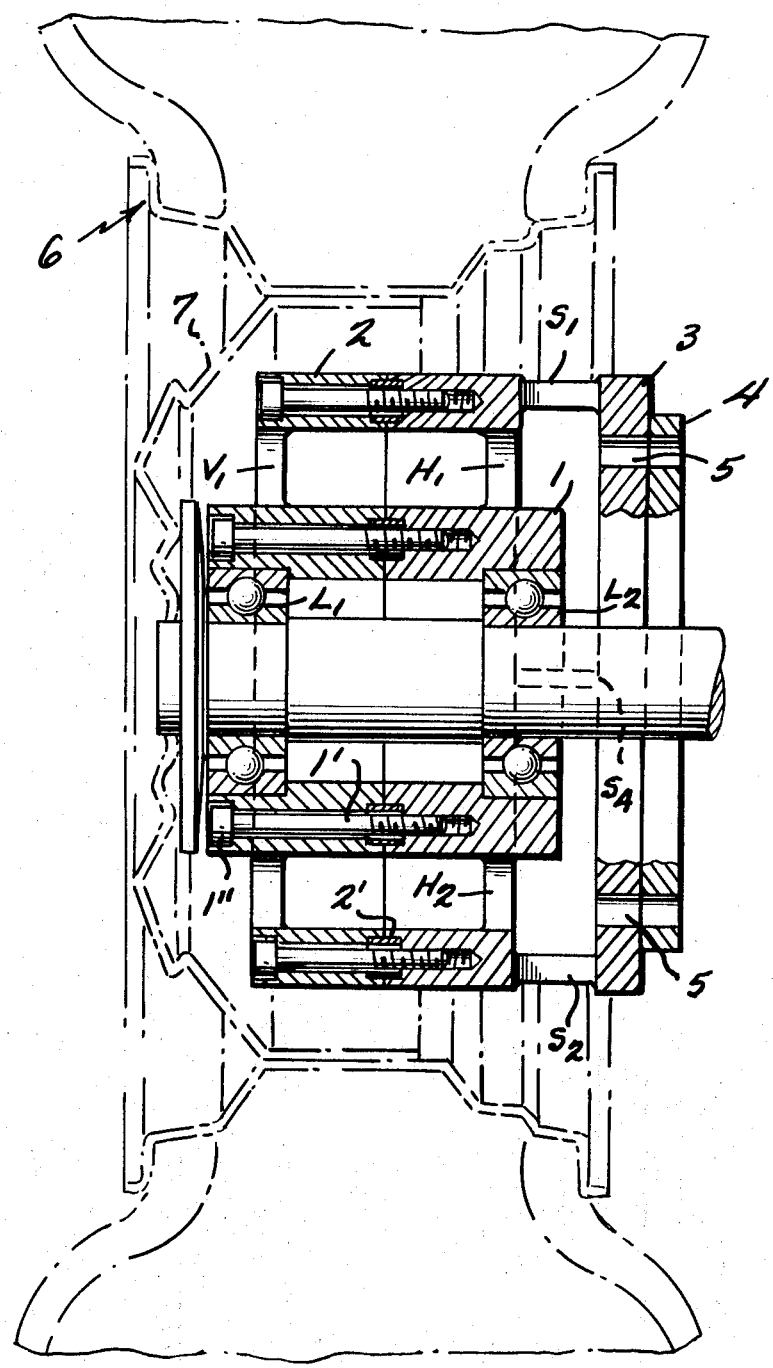
FIG. 1 shows a cut-away view of a first embodiment.
Figure 2:
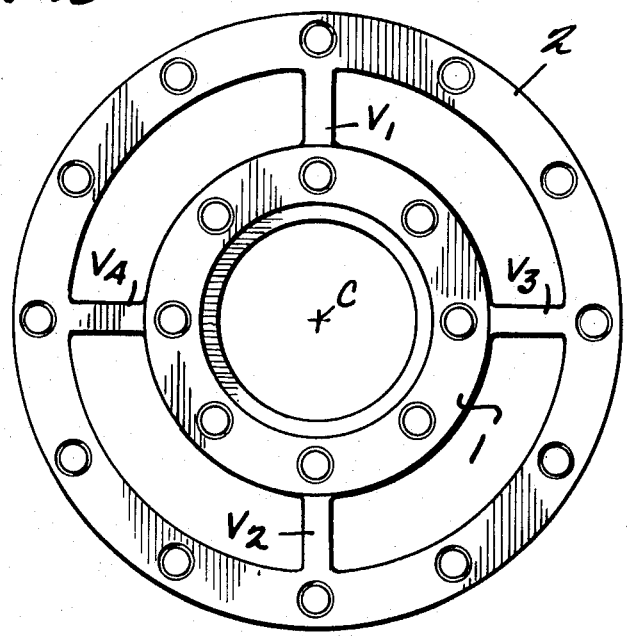
FIG. 2 shows a diagrammatical front view of the embodiment of FIG. 1.

The preferred embodiment of an instrumented hub according to the invention shown in FIGS. 1 and 2 substantially comprises a hollow internal cylinder 1 and a concentric external cylinder connected to it by means of four beams labeled V and H. The V ($V_{1-4}$) and H ($H_{1-4}$) beams are arranged in form of a so-called beam cross as shown in FIG. 2. The individual beams of each of these two beam crosses lie in planes which form a right angle with each other, vertical and horizontal beams alternating in vertical and horizontal positions. The two beam crosses V and H are symmetrical to the wheel center plane RM. In addition to the two beam crosses V and H, a third beam cross S is provided consisting of four further beams S ($S_{1-4}$) extending parallel to the rotational axis of wheel c.

Figure 4:
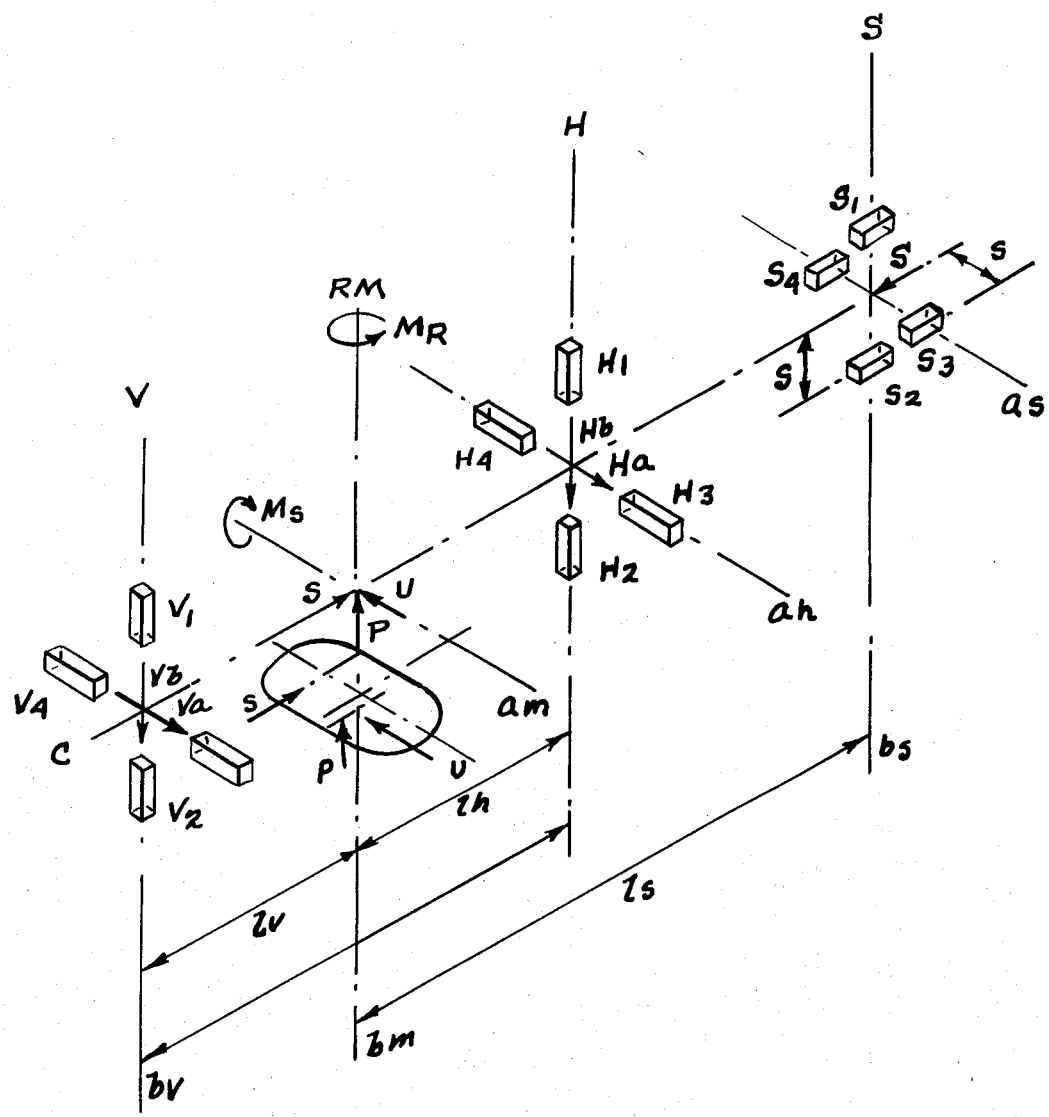
FIG. 4 is a diagrammatical view of the individual beams, forces, and moments.

As seen particularly in FIG. 4, beams V, H, and S bearing the indices 1 and 2 lie in the same plane, namely in a vertical one. Beams V, H, and S bearing the indices 3 and 4 are also placed in one plane. These two planes form a right angle with each other. The beams S are parallel to the axis of rotation c while the beams V and H are perpendicular to it.

Hollow external cylinder 2 is connected in one piece with a flange 3 by means of the beams S parallel to the axis of rotation, and horizontal. Therefore, in the embodiment according to FIGS. 1 and 2, a ring 4 is secured to flange 3 for attaching the whole instrumented hub to a motor vehicle axle, for instance, to a diagonal link. For this purpose, a number of through holes 5 are distributed over the periphery of ring 4.

As compared with beams V, H and S, the two cylinders 1 and 2 are rigid so that the deformations resulting from the forces and moments acting on the wheel occur in beams V, H, and S. All beams $S_1 - H_4$ are of the same form and shape and have the same dimensions in order that in all the beams S the same conditions of elasticity will exist. The $V_1 - V_4$ and $H_1 - H_4$ beams, too, are of the same form and shape and have the same dimensions in order to provide the same conditions of elasticity.

As illustrated in FIG. 1, internal cylinder 1 and external cylinder 2 consist of two cylinder halves in alignment, located with respect to each other by means of the spigots and guide sleeves 1' and 2'. For interconnecting the two cylinders 1 and 2, two bolts 1'' and 2'' are provided to connect the relevant halves with each other and to tighten them closely against each other.

The inner bore of internal cylinder 1 has two bearings L1 and L2 which are arranged symmetrically to the wheel center plane RM as is only diagrammatically depicted in FIG. 1 and which accommodate the drive shaft of a motor vehicle wheel 6 which is also only diagrammatically shown. As illustrated in FIG. 1, the instrumented hub according to the invention is of so restricted dimensions that it may be placed within the hollow space of a rim 7 of motor vehicle wheel 6. In order to permit an adaptation as simple as possible to the axes of different motor vehicle types, the largest diameter of the instrumented hub according to the invention is adapted to the outer diameter of the external cylinder 2 and, therefore, the mounting bores 5 of the fixing flanges 3, lie within this diameter. Thus, adaptation to different types of motor vehicles only requires changing fixing ring 4.

Figure 3:
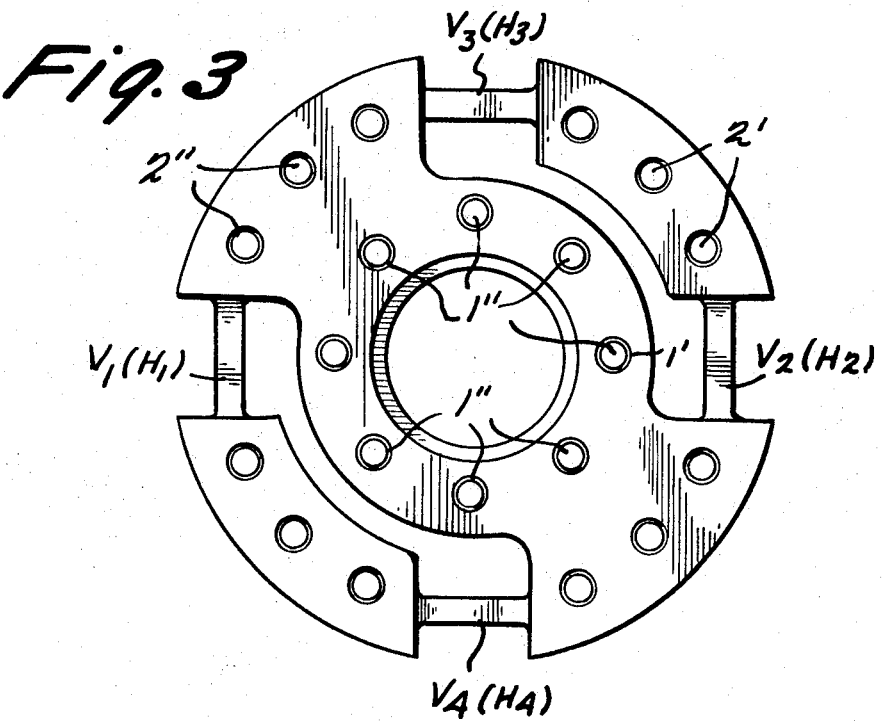
FIG. 3 shows a diagrammatical front view of a second preferred embodiment of the instrumented hub according to the invention.

A second preferred embodiment of the instrumented hub according to the invention illustrated in the diagrammatical front view of FIG. 3, substantially differs from that in FIG. 1 only in that the four beams V and H are not arranged in form of a cross but of a square and, therefore, the same reference marks as in FIG. 1 are used.

In the embodiment according to FIG. 3, beams V and H, which are of the same form and shape and have the same dimensions as in the embodiment of FIG. 1, may be a little longer so that a greater number of strain gauges can be applied.

The embodiment according to FIG. 3 is also represented by several guide sleeves 1' and 2' which are concentrically arranged to connecting bolts 1" and 2". This way of centering permits increasing the maximum allowable forces and moments. Should these values be further increased it may be desirable that the external and internal cylinders not be made each of two pieces, but of one piece each. This will also apply to the embodiments of FIGS. 1, 2 and 3.

Based on the embodiment according to FIGS. 1 and 2 and for the purpose of better understanding the invention, all of the 12 beams of the two beam crosses V and H and of the Beams S parallel to the axis of rotation are diagrammatically illustrated in FIG. 4 in which, with a view to simplicity, all other parts and more particularly the two hollow cylinders, have omitted. Regarding the local arrangement of the individual beams V, H and S and with a view of simplicity and shortening the description, we refer to FIG. 4 in which also the tread areas with the forces acting thereon are illustrated. The reference marks of FIG. 4 represents the following:

| | |
|---|---|
| S | lateral force (acting in direction of axis of rotation) |
| U | tangential force (acting perpendicularly to axis of rotation) |
| P | tire load and/or tire patch force (acting perpendicularly to S and U) |
| $M_R$ | steering moment (around axis $b_m$, caused by eccentric S and U) |
| $M_S$ | camber moment (around axis $a_m$, caused by S and eccentric P) |
| $V_{1-4}$ | sum total of forces of reaction of the strain gauges of beam cross V |
| $H_{1-4}$ | sum total of forces of reaction of the strain gauges of beam cross H |
| $S_{1-4}$ | sum total of forces of reaction of the strain gauges of beam arrangment S |
| $V_a$ | sum total of forces of reaction of the strain gauges $V_3$ and $V_4$ |
| $V_b$ | sum total of forces of reaction of the strain gauges $V_1$ and $V_2$ |
| $H_a$ | sum total of forces of reaction of the strain gauges $H_3$ and $H_4$ |
| $H_b$ | sum total of forces of reaction of the strain gauges $H_1$ and $H_2$ |
| $l$ | distance between the two beam crosses V and H |
| $l_{v,h}$ | distance of the two beam crosses V and/or H from the wheel center plane RM |
| $l_s$ | distance of the beam arrangement S from the wheel center plane RM |
| $a_{v,m,h,s}$ | horizontal axes across beam cross V, the wheel center, beam cross H, and beam arrangement S |
| $b_{v,m,h,s}$ | vertical axes across beam cross V, the wheel center, beam cross H, and beam arrangement S |
| $c$ | rotational axis of wheel |

In order to avoid the introduction of more marks, $V_1$, $V_2$ . . . and $H_1$ and $H_2$ . . . and $S_1$, $S_2$ . . . denote either the respective beams or the strain gauges attached thereto or the forces measured thereby. However, it will be quite obvious from the content whether V, H, and S stand for the beams, the strain gauges or the forces measured therein.

As according to the invention, the strain gauges are arranged on the beams between the two co-axial hollow cylinders in the area of minimum flexural moments, i.e., in such places where practically only pressure and tractive forces occur, the following calculation, based on the theory of linear elasticity, may be made in spite of the frequently indeterminate construction and support in statical respect 1. Equation of moments:

a. around axis $b_h$:

$$U \cdot l_h + M_R - V_a \cdot (l_v + l_h) = 0 \quad (I)$$

b. around axis $b_v$;

$$-U \cdot l_v + M_R + H_a \cdot (l_v + l_h) = 0 \quad (II)$$

Substration of equation II from equation I:

$$U - V_a - H_a = 0 \text{ plus } V_a = |V_3| + 0 | V_4| \text{ and } H_a = |H_3| + |H_4| \quad (III)$$

2. Equation of moments:

a. around axis $a_h$:

$$P \cdot l_h + M_s - V_b \cdot (l_v + l_h) = 0 \quad (IV)$$

b. around axis $a_v$:

$$-P \cdot l_v + M_s + H_b \cdot (l_v + l_h) = 0 \quad (V)$$

Subtraction of equation V from equation IV:

$$P - V_b - H_b = 0 \text{ plus } V_b = |V_1| + |V_2| \text{ and } H_b = |H_1| + |H_2| \quad (VI)$$

3.1 Equation of moments:

a. around axis $b_s$:

$$U \cdot l_s + M_R - (\overline{S}_4 + \overline{S}_3) \cdot s = 0 \quad (VII)$$

$$\overline{S}_3 = \overline{S}_4$$

$\overline{S}$ denotes the force components of the strain gauges S without taking into account the lateral force S.

b. around axis $a_s$:

$$P \cdot l_s + M_2 - (\overline{S}_1 + \overline{S}_2) \cdot s = 0 \quad (VIII)$$

$$\overline{S}_1 = \overline{S}_2$$

3.2 Sum of horizontal forces:

$$\overline{\overline{S}}_1 + \overline{\overline{S}}_2 + \overline{\overline{S}}_3 + \overline{\overline{S}}_4 - S = 0 \quad \text{(IX)}$$

$$\overline{\overline{S}}_1 = \overline{\overline{S}}_2 = \overline{\overline{S}}_3 = \overline{\overline{S}}_4 = S/4$$

$\overline{S}$ denotes the force components of the strain gauges $S$ caused by the lateral force $S$ only.

The total number of forces in the strain gauges comprises the following:

$$S_1 = (-)\overline{\overline{S}}_1 + (-)\overline{S_1}$$
$$S_2 = (-)\overline{\overline{S}}_2 + (+)\overline{S_2}$$
$$S_3 = (-)\overline{\overline{S}}_3 + (+)\overline{S_3}$$
$$S_4 = (-)\overline{\overline{S}}_4 + (-)\overline{S_4}$$

In the above, the pressure forces occurring in the beams carry a minus sign whereas the tractive forces have a plus sign. As $\overline{S}_1$ and $\overline{S}_2$ and/or $\overline{S}_3$ and $\overline{S}_4$ are forces of equal size, but of opposed direction and the beams $S$ have the same dimensions, form, and shape and are arranged symmetrically to the axis of rotation in both the horizontal and the vertical planes, compensation can be achieved by connecting the two strain gauges and/or resistors in series within a branch of a Wheatstone bridge circuit. As, according to the above, the forces cause extensions as well as compressions of equal size in the beams, the lateral force S is defined by the following equation:

$$[(-)\overline{S}_1 + (+)\overline{S}_2] + (-)\overline{S}_1 + (-)\overline{S}_2 + (+)\overline{S}_3 + (-)\overline{S}_4 + (-)\overline{S}_3 + (-)\overline{S}_4 = S \quad \text{(X)}$$

As can be gathered from the aforementioned equations III, VI, and X, the forces P, U, and S may be determined directly, that is to say independently of the $l_v/l_h$ relation. This implies that the two beam crosses $V$ and $H$ need not be arranged symmetrically to the wheel center in order to permit detection of forces. For the purpose of direct determination of moments, however, the $l_v/l_h$ relation should be further defined to reduce the circuitry as much as possible.

4. (I) + (II):

$$M_R + H_a \cdot l_h - V_a \cdot l_v = 0$$

From $l_v = l_h = \frac{1}{2}$ it follows that:

$$2M_R/l + H_a - V_a = 0 \text{ plus } H_a = |H_3| + |H_4|$$
$$V_a = |V_3| + |V_4| \quad \text{(XII)}$$

5. (IV) + (V):

$$M_s + H_b \cdot l_h - V_b \cdot l_v = 0$$

From $l_v = l_h = \frac{1}{2}$ it follows that:

$$2M_s/l + H_b - V_b = 0 \text{ plus } H_b = |H_1| + |H_2|$$
$$V_b = |V_1| + |V_2| \quad \text{(XIII)}$$

The forces of reaction $V_a, H_a, V_b, H_b, S_{1-4}$ on the bearings consist of the pressure and tractive forces $(-)V_4$, $(+)V_3$, $(-)H_4$, $(+)H_3$, $(-)V_1$, $(+)V_2$, $(-)H_1$, $(+)H_2$, $(=)S_1$, $(\mp)S_2$, $(\mp)S_2$, $(\mp)S_3$, $(=)S_4$, acting on the beams and causing the resistance variations in the strain gauges.

In this representation, for instance, two negative signs signify two pressure force components, and one positive and one negative sign stand for a pressure force and a tensile force component.

According to the invention, it is now desired that within the range of the instrumented hub, there should be linear proportionality between the forces and/or moments and the voltage variations of the Wheatstone bridge. In order to comply, the following reflections should be made:

The subsequent relation $U_A/U_E$ of a Wheatstone bridge charged by a certain constant input voltage $U_E$ and incorporating four resistors $R_1 \ldots R_4$ of which the output voltage is $U_A$ (V. FIGS. 5 to 9), corresponds to:

$$U_A/U_E = R_1/(R_1 + R_2) - R_4/(R_3 + R_4) = R_1 \cdot (R_3+R_4) - R_4(R_1+R_2)/(R_1+R_2) \cdot (R_3+R_4) \quad \text{(XIVa)}$$

$$R_1 + R_0 - \Delta R_1$$
$$R_2 = R_0 + \Delta R_2$$
$$R_3 = R_0 + \Delta R_3$$
$$R_4 = R_0 + \Delta R_4$$

In the above equation, $R_0$ stands for the resistance of a strain gauge upon which no force is bearing; this resistance, of course, is the same in all four branches of the Wheatstone bridge circuit and, therefore, the strain gauges are preferably of the same type, too. $\Delta R$ denotes the resistance variations resulting from extensions or compressions. Hence the following relation ensues:

$$U_A/U_E = [R_0 \cdot (\Delta R_1 - \Delta R_2 + \Delta R_3 - \Delta R_4) + \Delta R_1 \cdot \Delta R_3 - \Delta R_2 \Delta R_4]/[4R_0^2 + 2R_0(\Delta R_1 + \Delta R_2 + \Delta R_3 + \Delta R_4) + (\Delta R_1 + \Delta R_2) \cdot (\Delta R_3 + \Delta R_4)] \quad \text{(XIVb)}$$

If linear proportionality for the voltage variations of the Wheatstone bridge circuit and the forces and moments acting on the wheel is required, $M_A/U_E$ and $\Delta R$ must be linearly proportional since in the resilient area, linear proportionality exists between the voltage variations of the strain gauges and the stresses and/or deformations of the beams. Equation XIVb, therefore, must meet the following conditions (with respect to proportionality):

$$U_A/U_E = \text{const } \Delta R$$

Hence, it follows that:

$$U_A = \text{const } \cdot \Delta R, \text{ since } U_E = \text{const.}$$

This indicates that:

1. $\Delta R_1 \cdot \Delta R_3 - \Delta R_2 \Delta R_4 = 0$

2. $\Delta R_1 + \Delta R_2 + \Delta R_3 + \Delta R_4 = 0$

3. $(\Delta R_1 + \Delta R_2) \cdot (\Delta R_3 + \Delta R_4) = 0$

These three conditions are met if:

$$\Delta R_1 = \Delta R_2$$
$$\Delta R_3 = \Delta R_4$$

Hence, it follows that:

$$U_A/U_E = \Delta R_1 + \Delta R_3/2R_0 \quad \text{(XIVc)}$$

By the aforementioned equation XIVb, the maximum of $U_A/U_E$ can be determined in a known manner (first derivation = 0) and the value of maximum sensitivity can be computed. Surprisingly, the result shows that the maximum sensitivity is also $U_A/U_E$ according to equation XIVc, thus complying with the desire for linearity.

Based on the angular and symmetrical conditions and the demand that $\Delta R_1 = -\Delta R_2$, and $\Delta R_3 = -\Delta R_4$, the individual strain gauges of the various beams arranged as depicted schematically in FIG. 4 may most simply be attributed to the resistors $R_1$ to $R_4$ of the Wheatstone bridge with the aid of the aforementioned force and moment equations I to X.

As according to the above explanations concerning the desired linearity, the voltage variations marked by the indices 1, 2, and 3, 4, respectively, should be inversely equal, the strain gauges corresponding to the resistors $R_1$, $R_2$ and/or $R_3$, $R_4$ in the geometrical arrangement and configuration of the beams shown in FIG. 4, must be attached to the beams which are facing each other in the beam cross.

With respect to the determination of forces and moments, it is significant whether the voltage variations $R_1$ and $R_3$ are equidirectional or opposed. If the strain gauges are so applied that $R_1$ and $R_3$ are equidirectional, the voltage variations will remain constant irrespective of the origin of force. The difference in voltage variations, however, constitutes an index for the product of force by lever arm, so that moments can be measured directly through the fact that the strain gauges together with the resistors $R_1$ and $R_2$ are attached diagonally opposite to the beam crosses V and H.

By taking into account the above description, the individual wiring diagrams of the Wheatstone bridge as shown in FIGS. 5 to 9 will serve to determine the various forces and moments with a view to the beam arrangement of FIGS. 1 and 2.

Figure 5:
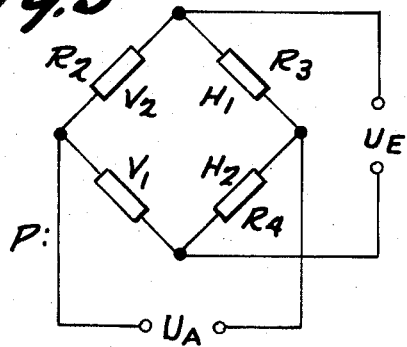
FIGS. 5 to 9 show preferred Wheatstone bridge circuits for the detection of the individual forces and moments.

FIG. 5 represents a circuit for detecting the tire patch force P, taking equation VI as basis and subject to the following conditions:

$$H_1 = -H_2$$
$$V_1 = -V_2$$

Figure 6:
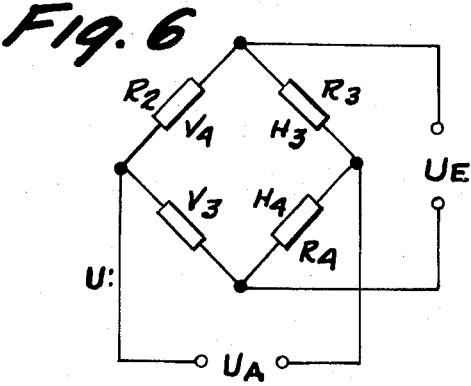

FIG. 6 represents a circuit for measuring the tangential force U, based on the equation III and the relation:

$$H_4 = -H_3$$
$$V_3 = -V_4$$

Figure 7:
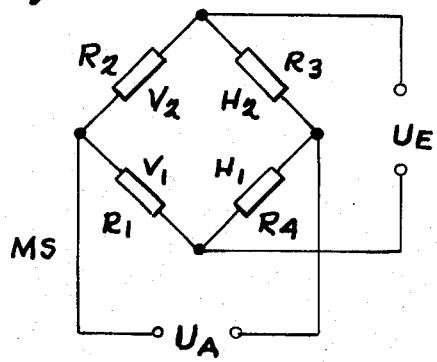

FIG. 7 represents the circuit for measuring $M_S$, based on equation XII and the following relation:

$$H_2 = -H_1$$
$$V_2 = -V_1$$

Figure 8:
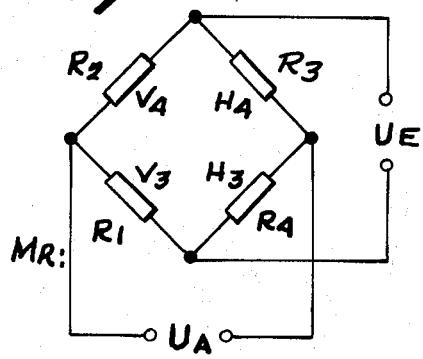

FIG. 8 represents the circuit for measuring $M_R$, based on equation XIII and the following relation:

$$H_3 = -H_4$$
$$V_3 = -V_4$$

Figure 9:
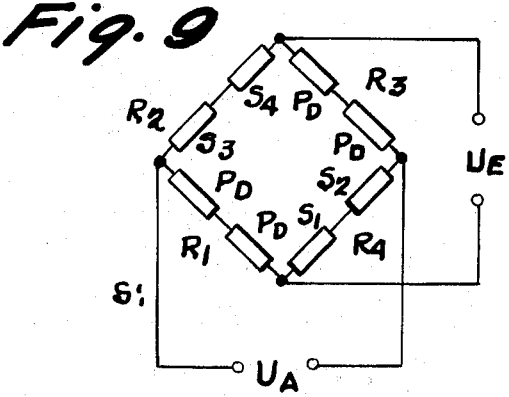
Figure 10:
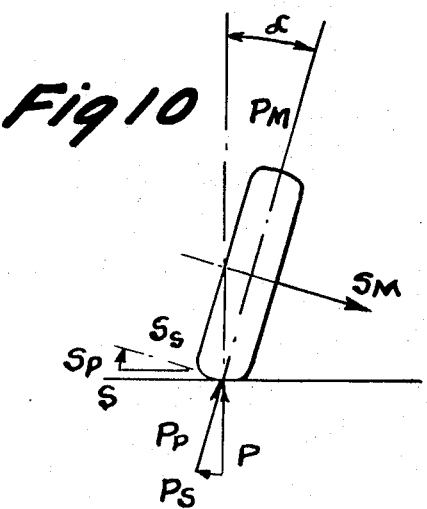
FIG. 10 shows a diagrammatical view of corrections to be made under a certain camber condition.

FIG. 9 represents the circuit for measuring the lateral force S.

The above relations according to which certain values of H and V are inversely equal do not only derive from the equations I to X but can also be conceived from view. Taking into account the symmetry and the special angular conditions of the beam arrangement according to FIG. 4, it may be concluded without drawing upon any particular computations that the beams $V_2$ and $H_2$ are being extended under the action of the patch force P. The reason for this is the fact that as already mentioned above, all beams of the beam cross V and H are of the same form and shape and have the same dimensions and that the individual beams are either parallel or perpendicular to the direction of forces and/or the direction of the vector of moments. In case the moments and vectors of moments acting on a wheel from outside should not act parallelly and perpendicularly to the orthogonal directions of the beam crosses, a further break-down of the perpendicular and parallel components must be effected.

Regarding the accurate arrangement, circuit, and order of the strain gauges corresponding to the individual strain resistors $R_1$ to $R_4$, reference is made to FIGS. 5 to 9 for the purpose of abbreviating the description: Further the strain gauges corresponding to the resistors $R_2 - R_4$ may easily be mistaken for each other unless strict proportionality and linearity are observed since the quadratic terms resulting therefrom only slightly deviate from linearity if the forces applied are not excessive (for instance less than 500 kp).

As can be seen from FIG. 4, the two beam crosses V and H disposed symmetrically to the wheel center plane RM are designed symmetrically, are of the same type, and are aligned with each other, each beam cross consisting of four large beams equal in form and shape, while the beams of the separate two beam crosses V and H are also of the same form and shape and have equal dimensions. The two aligned beams of beam cross V lie in one plane with two other also aligning beams of beam cross H. The same applies to the residual two beams.

Beams S, as opposed to the beam crosses V and H, are not perpendicular in their longitudinal direction but parallel to the axis of rotation. In this arrangement, too, the opposed two beams lie in the same plane, i.e., in a horizontal and load a vertical plane. Beams S need not be formed, shaped, and dimensioned like beams V and H since, according to the wiring diagrams of FIGS. 5 to 9, they are not connected with the beams of beam crosses V and H but are present only in the diagram of FIG. 9. As already mentioned, beams S may also comprise two beams only. In this case, these are situated either in a horizontal or in a vertical plane formed by the corresponding beams of the crosses V anad H. If beams S include four beams each spaced at 90°, two beams, each will lie in the same horizontal and/or vertical plane as the corresponding beam pairs of the crosses V and H.

Similar reflections as conducted above with respect to the first embodiment as per FIGS. 1 and 2 will also refer to the wiring diagrams of the strain gauges of the second embodiment according to FIG. 3.

The wiring diagrams of the strain gauges in the embodiment as per FIG. 3 are identical with that illustrated in FIGS. 1 and 2 provided that the individual beams are marked and/or arranged as in FIG. 3.

In principle, as already mentioned above, the same considerations as adopted in connection with the embodiment per FIGS. 1 and 2 apply to the embodiment of FIG. 3. Accordingly, only briefly will there be shown in the following with reference to the tire load and/or patch force P that in the embodiment per FIG. 3 the same relations exist as in the embodiment of FIGS. 1 and 2 and more particularly that strict proportionality is maintained.

In the embodiment of FIG. 3, the beams disposed in squares are arranged in two parallel planes, each plane comprising four beams. A tire load P acting eccentrically from outside in a distance 'a' (on the left-hand of the wheel center in FIG. 4) on a tire can be plotted by an equal force acting in central direction and by a moment P.a around an axis in the central plane. The central force P is received at equal parts by both the beam planes with the result that Beams $V_1$ and $H_1$ are extended as illustrated in FIG. 3 whereas beams $V_2$ and $H_2$ are compressed. Under the action of the moment P.a in the first beam plane — which is on the left-hand to the wheel center plane in FIG. 4 — the beam $V_1$ is extended whereas beam $V_2$ is compressed. In the second beam plane — on the right-hand side to the wheel center plane in FIG. 4 — beam $H_1$ is compressed whereas beam $H_2$ is extended. Consequently, the following forces are present in the individual beams:

$$V_1 = (+) \cdot P/4 + (+) \cdot M/2l$$
$$V_2 = (-) \cdot P/4 + (-) \cdot M/2l$$
$$H_1 = (+) \cdot P/4 \quad (-) \cdot M/2l$$
$$H_2 = (-) \cdot P/4 + (+) \cdot M/2l$$

plus $l = 2 l_v = 2 l_h$ and $M = P.a$.
The force P, therefore, will result from:

$$V_1 + H_1 - (V_2 - H_2) = 2 M/l.$$

$V_1$ being equivalent to $-V_2$ and $H_1$ to $-H_2$, strict proportionality can be achieved in the embodiment to FIG. 3, since in this case the beams are so arranged that compression of $V_1$ will occur in association with the extension of $V_2$. When the lettering of the individual beams as in FIG. 3 is retained, the same wiring diagrams as for the first embodiment according to FIGS. 1 and 2 will result with respect to the second embodiment according to FIG. 3, these wiring diagrams being illustrated in FIGS. 5 to 9.

As already mentioned, the two beam crosses V and H may also be arranged unsymmetrically to the wheel center plane without leaving the frame of the invention, involving, however, a slightly enlarged control and measuring mechanism. This, however, will be only important to the detection of moments since the unsymmetrical arrangement is not significant to the detection of forces.

In contrast to the embodiments described above, the two beam crosses V and H may also be combined to one beam cross of corresponding form which will best be arranged in the wheel center plane. In this case, however, only forces and no moments can be measured. If no moments are to be determined, the instrumented hub can further be simplified by providing only one beam in the direction of force measuring and/or parallel thereto. As a further variation, a beam cross according to FIGS. 1 and 2 may be used in connection with a beam square according to FIG. 3.

As the instrumented hub installed on a vehicle wheel partakes in all camber and slip movements there preferably are some corrections in determining some of the forces. The instrumented hub does only detect the components of a wheel rotating under camber conditions:

$$P_M = P_p + S_p = P \cdot \cos\alpha + S \cdot \sin\alpha$$
$$S_M = S_s - P_s = S \cdot \cos\alpha - P \cdot \sin\alpha$$

In the above equations with reference to FIG. 16, $\alpha$ stands for the camber angle, and the forces indicated by S and P stand for the force components of the patch force P and the lateral force S acting parallel and perpendicular to the rotational axis of the wheel.

By combining the above equations the following will result:

$$P = P_M \cdot \cos\alpha - S_M \cdot \sin\alpha$$

(XVa)

$$P = S_M \cdot \cos\alpha + P_M \cdot \sin\alpha$$

(XVIa)

Even in relatively large camber angles of almost 10°, the absolute as well as relative error limit remains under 2%, since with reasonable exactitude the following may be put:

$$\cos\alpha \approx 1$$
$$\sin\alpha \approx \alpha$$

Hence it follows that:

$$P = P_M - S_M \cdot \alpha° \text{ hu} . \pi/180$$

(XVb)

$$S = S_M + P_M \cdot \alpha° \cdot \pi/180$$

(XVIb)

The above relation between the really existing forces and those measured as a function of the camber angle may be plotted by a subsequent potentiometer and an operational amplifier, the resistance variation of the potentiometer being a certain linear function of the camber angle.

As the axes of reference of the moments discussed are situated in the wheel center plane a subsequent correction must only be made of the forces S and P.

By attaching, according to this invention, the strain gauges in the beam center, thereby eliminating flexural tensions, the aforementioned linear dependence is guaranteed also for the measurement of moments, while there is the further advantage that possible disturbing effects are reduced as much as possible.

As discussed above, the instrumented hub according to the invention may be used on tire and wheel test stands as well as on vehicles in motion, and it is designed for measurements on the driven as well as the non-driven wheel. By providing slight revisions of the design, the device may be adapted to different wheel and/or axis suspensions. As the instrumented hub assembly incorporates relatively little mass as compared with the whole non-resilient mass, repeatability of the measuring results is guaranteed under heavy intermittent tire loads.

If the instrumented hub is to be designed for n-fold load, $\sqrt{n}$-fold magnification will be sufficient in order to obtain linearity for the whole new range of design. Since several strain gauges can be attached to the beams, it is possible to considerably increase the sensitivity of the instrumented hub by connecting in series a D.C. amplifier.

The portion of exterior forces and moments absorbed not only by the beams subjected to pressure and/or tensile load but by those subjected to flexure may easily be detected and taken into account in plotting the calibration curves; it is of particular advantage in this instance that the calibration curves — as already mentioned — are straight lines, since by this partial absorption of the exterior forces and/or moments by the beams responding to flexure, linearity will not be affected.

Even though the preferred field of application of the instrumented hub according to the invention is the measurement of forces and moments acting on motor vehicle wheels, it is apparent that the instrumented hub according to the invention is also suited to the detection and measurement of forces and moments acting on any rotors at choice. Accordingly, the scope of the invention is intended to be limited only by the scope of the appended claims.

What is claimed is:

1. An apparatus for measuring forces and/or moments acting on a rotor in motion comprising:
   a hub having a pluraity of sets of beams with the beams in each set extending in planes forming right angles with respect to each other and resiliently deformable under the action of forces and/or moments applied to the hub, said beams extending in planes parallel to directions of individual forces applied to the hub and parallel to a plane perpendicular to the respective vector of moments produced by the hub so that the forces and moments cause only extensions and contractions of said beams, one of said sets comprising four beams extending parallel to each other and parallel to the rotational axis of the rotor,
   means for attaching said hub to said rotor, and
   a plurality of strain gauges each attached to one of said beams so as to produce a signal varying as a function of the deformation of the beam to which it is attached.

2. An apparatus as in claim 1 including means connected to said strain gauges for determining the measured forces.

3. An apparatus as in claim 2 wherein said determining means includes means connecting said strain gauges in a Wheatstone bridge circuit.

4. An apparatus as in claim 1, wherein said rotor has a center plane and one set of beams comprising four beams alternately extending in vertical and horizontal planes, the intersections of which form, in cross section, a rectangle, said four beams also extending in a plane parallel to said rotor center plane.

5. Apparatus as in claim 1, wherein four beams form a cross.

6. Apparatus as in claim 1, wherein four beams form a rectangle.

7. Apparatus as in claim 6, wherein said four beams form a square.

8. Apparatus as in claim 1, wherein said hub further includes a hollow inner body and a hollow outer body interconnected by said beams, wherein the two bodies constructed rigidly in contrast to the beams so that owing to the forces and/or moments only the beams are substantially resiliently deformed.

9. Apparatus as in claim 8, wherein said inner and outer bodies are cylinder.

10. Apparatus as in claim 8, wherein said hollow inner body includes bearings for accommodating a drive shaft for the rotor.

11. Apparatus as in claim 1, wherein said strain gauges are each fixed in the center of one of the beams and in longitudinal direction to that beam.

12. Apparatus as in claim 1, wherein at least one strain gauge is applied to each side of each beam.

13. An apparatus for measuring forces and/or moments acting on a rotor in motion about a rotational axis comprising:
   a hub having a plurality of sets of beams with the beams of each set extending at right angles with each other and resiliently deformable under the action of forces and/or moments applied to the hub, said beams extending in planes parallel to directions of individual forces applied to the hub and in planes parallel to a plane perpendicular to the respective vector of moments produced by the hub so that the forces and moments cause only extensions and contractions of said beams, said sets including a first set of beams having two beams extending in a plane parallel to the direction of a patch force P acting on said rotor with said two beams being on opposite sides of said rotational axis and a second set of beams having two beams extending in a plane parallel to the direction of said patch force P with said two beams being on opposite sides of said rotational axis,
   means for attaching said hub to said rotor,
   a plurality of strain gauges each attached to one of said beams so as to produce a signal varying as a function of the deformation of the beam to which it is attached,
   means for connecting the strain gauges attached to said two beams from each of said first and second sets in a Wheatstone bridge circuit for sensing said patch force P, the strain gauges of those beams on the same side of said rotational axis being opposed in the Wheatstone bridge, and
   means for applying an input voltage to two points of said bridge circuit interconnecting the strain gauges of two beams which are each on different sides of said rotational axis and which are not in alignment with each other.

14. An apparatus for measuring forces and/or moments acting on a rotor in motion about a rotational axis comprising:
   a hub having a plurality of sets of beams with the beams in each set extending at right angles with each other and resiliently deformable under the action of forces and/or moments applied to the hub, said beams extending in planes parallel to directions of individual forces applied to the hub and parallel to a plane perpendicular to the respective vector of moments applied to the hub so that the forces and moments cause only extensions and contractions of said beams, said sets including a first set of beams having two beams extending in a plane parallel to the direction of a tangential force U acting on said rotor with said two beams being on opposite sides of said rotational axis and a second set of beams having two beams extending in a plane parallel to the direction of said tangential force U with said two beams being on opposite sides of said rotational axis,
   means for attaching said hub to said rotor,
   a plurality of strain gauges each attached to one of said beams so as to produce a signal varying as a function of the deformation of the beam to which it is attached,
   means for connecting the strain gauges attached to said two beams from each of said first and second sets in a Wheatstone bridge circuit for sensing said tangential force U, the strain gauges of those beams on the same side of said rotational axis of said rotor being opposed in the Wheatstone bridge, and means for applying an input voltage to two points of said bridge circuit interconnecting the strain gauges of two beams which are each of different sides of said rotational axis, and which are not in alignment with each other.

15. An apparatus for measuring forces and/or moments acting on a rotor in motion about a rotational axis comprising:

a hub having a plurality of sets of beams with the beams of each set extending at right angles with each other and resiliently deformable under the action of forces and/or moments applied to the hub, said beams positioned parallel to directions of individual forces applied to the hub and parallel to a plane perpendicular to the respective vector of moments applied to the hub so that the forces and moments cause only extensions and contractions of said beams, said sets including a first set of beams having two beams extending in a plane parallel to the vector of a camber moment $M_s$ acting on said rotor with said two beams being on opposite sides of said rotational axis and a second set of beams having two beams extending in a plane parallel to the vector of the camber moment $M_s$ with said two beams being on opposite sides of said rotational axis, means for attaching said hub to said rotor, a plurality of strain gauges each attached to one of said beams so as to produce a signal varying as a function of the deformation of the beam to which it is attached, means for connecting the strain gauges attached to said two beams from each of said first and second sets in a Wheatstone bridge circuit for sensing said camber moment $M_s$ of said rotor, one of said strain gauges on a beam from each of said first and second sets being opposite to each other in the Wheatstone bridge and means for applying an input voltage to two points of said bridge circuit interconnecting the strain gauges of two beams which are on different sides of the rotational axis of the rotor and are not in alignment with each other.

16. An apparatus for measuring forces and/or moments acting on a rotor in motion about a rotational axis comprising:

a hub having a plurality of sets of beams with the beams in each set extending at right angles with each other and resiliently deformable under the action of forces and/or moments applied to the hub, said beams extending in planes parallel to directions of individual forces applied to the hub and parallel to a plane perpendicular to the respective vector of moments applied to the hub so that the forces and moments cause only extensions and contractions of said beams, said sets including a first set of beams having two beams extending in a plane perpendicular to the vector of a steering moment $M_R$ acting on said rotor with said two beams being on opposite sides of said rotational axis and a second set of beams having two beams extending in a plane perpendicular to the vector of the steering moment $M_R$ with said two beams being on opposite sides of said rotational axis, means for attaching said hub to said rotor, a plurality of strain gauges each attached to one of said beams so as to produce a signal varying as a function of the deformation of the beam to which it is attached, means for connecting the strain gauges attached to said two beams from each of said first and second sets in a Wheatstone bridge circuit for sensing said steering moment $M_R$ of said rotor, those strain gauges of the beams being opposite to each other in the Wheatstone bridge which are arranged in spaced relation in the direction of said rotational axis and on different sides of it, and means for applying an input voltage to two points of said bridge circuit interconnecting the strain gauges of two beams which are on different sides of the rotational axis of said rotor, and are not in alignment with each other.

17. An apparatus for measuring forces and/or moments acting on a rotor in motion about a rotational axis comprising:

a hub having a plurality of sets of beams with the beams of each set extending at right angles with each other and resiliently deformable under the action of forces and/or moments applied to the hub, said beams positioned parallel to directions of individual forces applied to the hub and parallel to a plane perpendicular to the respective vector of moments applied to the hub so that the forces and moments cause only extension and contractions of said beams, said sets including a first set of beams having four beams extending in a plane parallel to the direction of a lateral force S acting on said rotor and including two pairs of beams with the beams in each pair being on opposite sides of said axis, means for attaching said hub to said rotor, two pairs of passive strain gauges, a plurality of strain gauges each attached to one of said beams so as to produce a signal varying as a function of the deformation of the beam to which it is attached, means for connecting said first set of strain gauges and said passive strain gauges in a Wheatstone bridge circuit for sensing said lateral forces S, those strain gauges in each pair of said first set being connected in series in the Wheatstone bridge and said passive strain gauges being connected in series, and means for applying an input voltage to two points of said bridge circuit interconnecting a branch with beams of said first set and one with passive strain gauges.

* * * * *